July 7, 1942.   S. R. STRADER   2,288,926
TAILGATE LATCH
Filed March 12, 1941   2 Sheets-Sheet 1
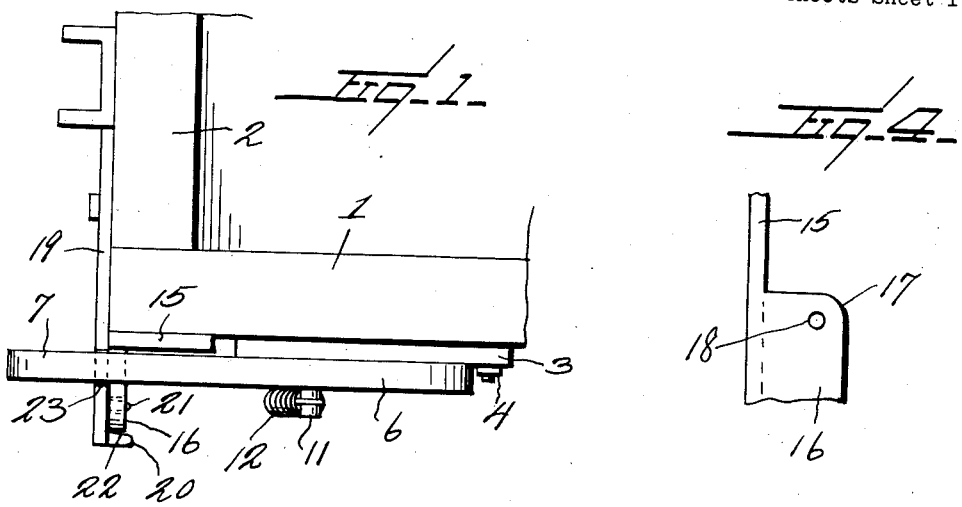
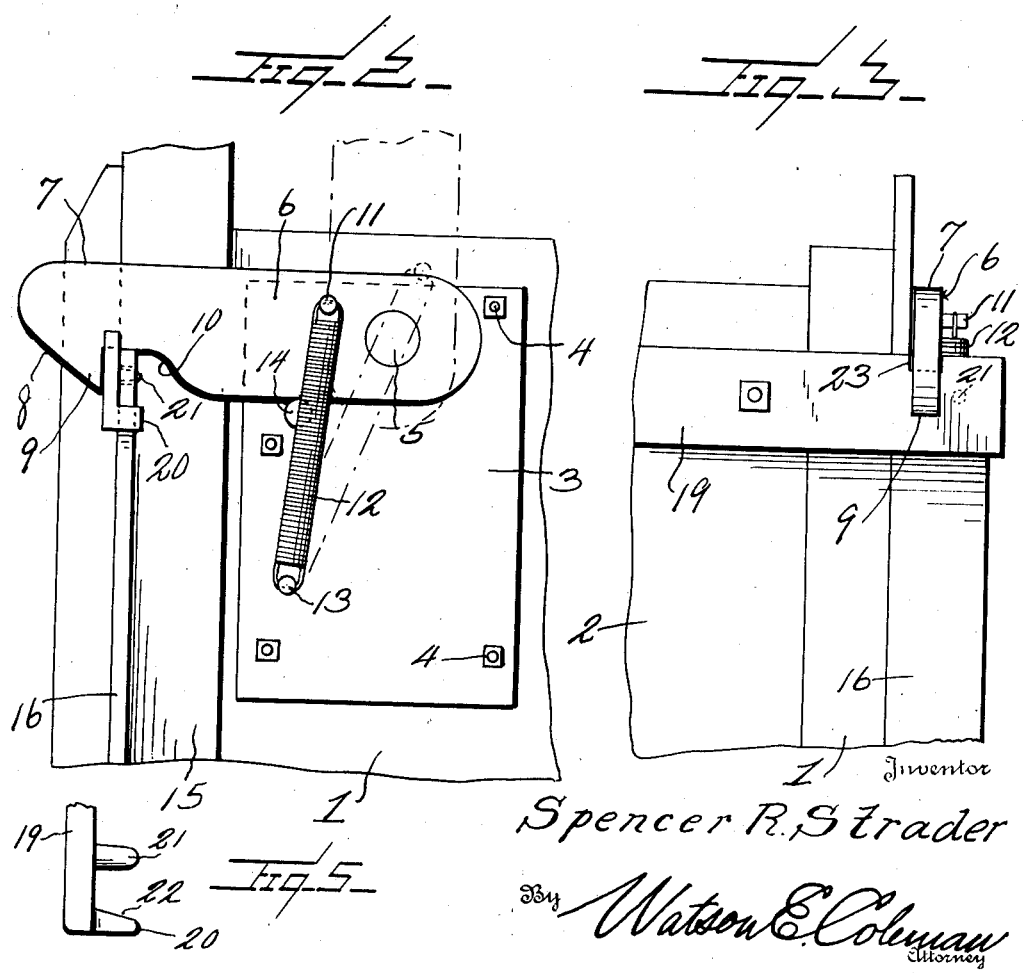
Inventor
Spencer R. Strader
By Watson E. Coleman
Attorney

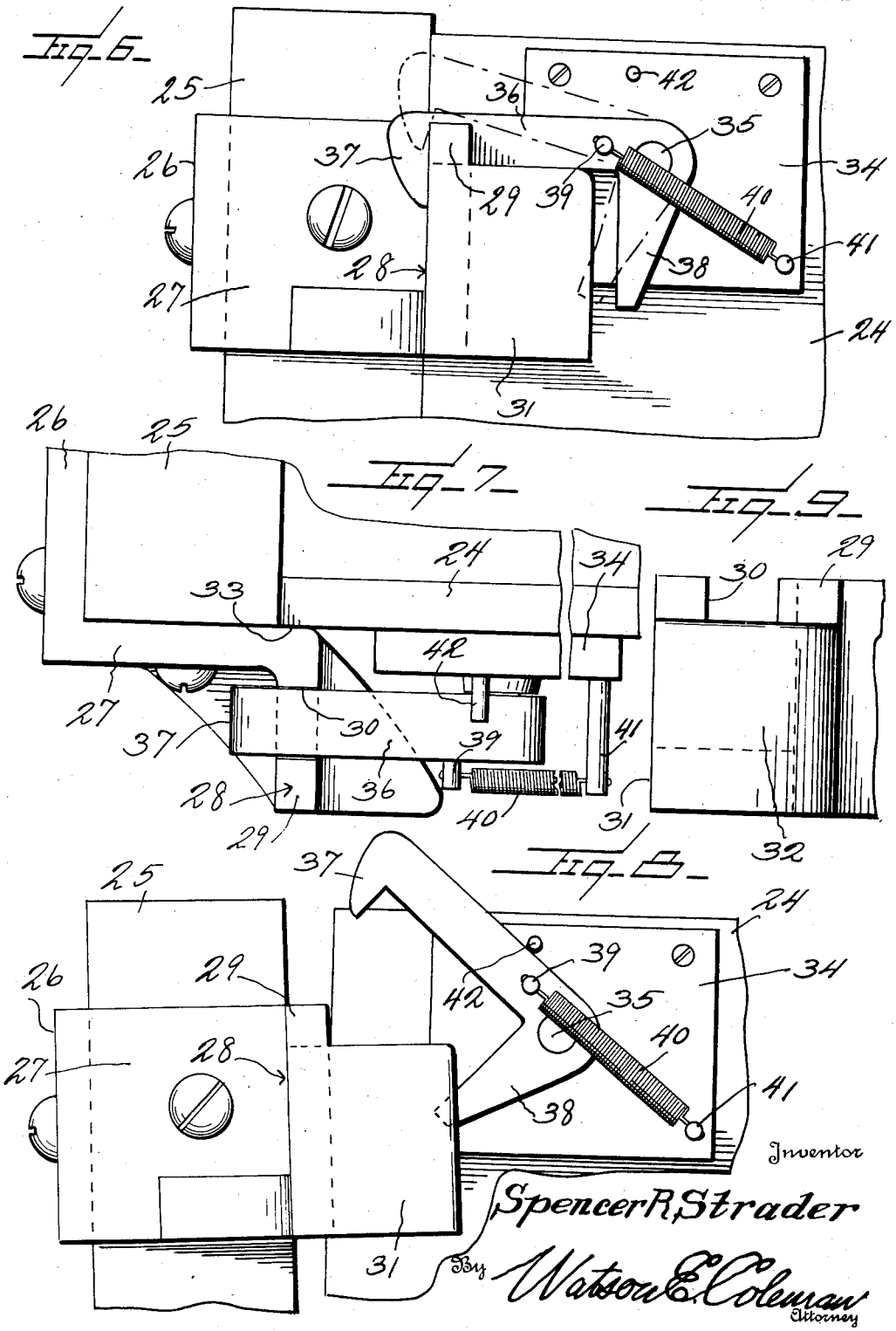

Patented July 7, 1942

2,288,926

UNITED STATES PATENT OFFICE 2,288,926

TAILGATE LATCH

Spencer R. Strader, Hanford, Calif.

Application March 12, 1941, Serial No. 382,997

11 Claims. (Cl. 292—99)

This invention relates generally to the class of wheeled vehicles and pertains particularly to improvements in tail gate securing or latching means.

The primary object of the present invention is to provide a latching means especially designed for use in connection with tail gates of trailers or other types of trucks or wheeled vehicles employed for transporting animals, wherein the latching of the tail gate may be easily and quickly accomplished merely upon the closing of the gate and the side walls of the truck or trailer will be firmly locked to or coupled with the side edges of the tail gate so that it will be strongly reinforced and held against any strains placed thereon by the animals throwing their weight against the side walls.

Another object of the invention is to provide a latching means for a tail gate which double locks the tail gate with the adjacent side walls of the vehicle to prevent swinging of the gate rearwardly and to prevent lateral movement of the side walls away from the end edges of the gate.

A further object of the invention is to provide a latching device of the character stated which will effectively couple together the side walls of a truck or trailer and the tail gate and which, when the tail gate is released and lowered, does not present any projecting parts either toward the rear of the truck from the side walls or inwardly from the side walls which might injure an animal being loaded into the trailer.

The invention will be best understood from a consideration of the following detailed description taken in connection with the accompanying drawings, it being understood, however, that the invention is not to be considered as limited by the specific illustration or description but that such illustration and description constitutes a preferred embodiment of the invention.

In the drawings:

Fig. 1 is a view in top plan of the coupling embodying the present invention showing the same applied.

Fig. 2 is a view in side elevation of the applied coupling.

Fig. 3 is a view in rear elevation of the applied coupling.

Fig. 4 is a detail view of a portion of the coupling structure.

Fig. 5 is an enlarged detail view of a portion of the keeper bar showing the camming means for drawing the side wall of the gate inwardly.

Fig. 6 is a view in side elevation of a modification of the latching structure which is designed for use upon gates which close against the rear edges of the side walls of the body instead of entering between such walls.

Fig. 7 is a view in top plan of the mechanism shown in Fig. 6.

Fig. 8 is a view in side elevation of the mechanism of Fig. 6, showing the manner in which the latch is automatically secured on closing the gate.

Fig. 9 is a view looking toward the cam surface of the nose of the casting.

Referring now more particularly to the drawings, the numeral 1 designates a portion of a side wall of a trailer, truck or other wheeled structure in association with which the present latching device might be used, while the numeral 2 designates the tail gate which may be pivotally connected at its lower end in the customary manner to the floor of the truck, not shown.

The latching device which will be located at each side of the truck and at each vertical side edge of the tail gate comprises a body or carrier plate 3 which is secured to the outer side of the side wall 1 by bolts 4 or in any other suitable manner. This plate carries a pivot stud 5 on which is oscillatably mounted a latching link 6 which has a head 7 provided with the rounded edge 8 leading to the point of the hook bill 9. As shown, the hook bill is formed by cutting away the lower edge of the link at 10, and this cut away portion functions to receive cooperating fixed parts of the latch structure.

The latch 6 carries a pin 11 which, when the latch is in horizontal or operative position, is located adjacent the top edge of the latch above the pivot stud 5 and rearwardly thereof. In other words, the pin 11 is located between the stud 5 and the head 7 of the latch. This pin 11 is connected by a contractile spring 12 with a pin 13 which is secured to the plate 3 below and rearwardly of the stud 5, so that the spring constantly functions to swing the latch downwardly into operative position. The downward swinging movement of the latch is limited, however, by the stop pin 14 which is carried by the plate 3 rearwardly of the stud 5 and which operates to maintain the latch horizontal when it is in operative position.

Secured along the outer side of the wall 1 rearwardly of the plate 3 is a reinforcing bar 15 which is of angle form and has the flange 16 thereof directed outwardly or laterally from the wall. This flange terminates at its upper end in a plane below the top of the plate 3 and is formed to provide the outwardly rounded shoulder edge 17 and the top end of the flange is located slightly below the top edge of the tail gate 2 when the latter is in raised position. Just below the upper end of the flange there is formed through the flange the pin opening 18.

Secured to the rear face of the tail gate adjacent and extending along the top edge thereof is a keeper bar 19 which extends beyond the adjacent vertical edge of the gate and terminates in the forwardly turned tongue 20. When the gate is in closed position, this keeper bar extends across the rear side of the flange 16 and lies over the opening 18 and the tongue 20 engages across the outer or laterally directed edge of the flange.

Carried by the keeper bar 19 is a pin 21 which is adapted to enter the opening 18 of the adjacent flange. The tongue 20 serves, by reason of the cammed formation of its inner face as indicated at 22, to pull the side wall in toward the edge of the tail gate when the latter is closed so as to aline the pin 21 with the opening 18 of the wall carried flange. The top edge of the keeper bar 19 has formed therein the notch 23 which, when the gate is closed, is in position to receive the latch 6, the bill 9 of the latch engaging over the rear face of the keeper bar. When the tail gate is lowered, the latch 6 may be allower to rest on the pin 14 where it will be held by the spring 12, and in this position the bottom of the cut-out or recess 10 of the latch will lie against or in close proximity with the top end of the flange 16. While the latch is in this position, the tail gate may be forcibly closed and automatically secured due to the fact that the notched edge of the keeper bar 19 will ride under the rounded edge 8 of the head of the latch and lift it against the tension of the spring 12 until the bill of the latch can drop behind the keeper bar. As previously stated, when the keeper bar is forced against the flange 16, the cam-like inner side of the keeper bar tongue 20 will guide the pin 21 through the opening 18 of the flange 16.

From the foregoing, it will be readily apparent that when the latching means is operative to secure a tail gate to a side wall of the trailer or other body in association with which it is used, the gate will not only be held against accidental opening but there will be established a locking connection between the vertical edge of the gate and the adjacent side wall which will prevent any lateral movement of the side wall with respect to the gate. This is particularly important in structures used for the carrying of cattle as cattle impose a severe strain upon side walls of trailers in which they are carried, and with the arrangement of the present latching mechanism, it will be seen that the side walls of the trailer will be coupled together through the medium of the tail gate and thus will be readily held against being sprung outwardly. If, as a result of strains placed on the side walls when the gate is opened, such side walls do become sprung outwardly, it will be seen that the beveled or cam-faced tongue 20 of the keeper bar will function to draw the wall back into normal position when the gate is closed, so that the coupling pin 21 may enter the keeper opening 18 of the adjacent flange.

Another important feature of the present latching devices is that it makes possible the rapid latching of the gate after it has been closed. This is another feature which is particularly of importance where cattle are being handled, since cattle have a tendency to back up against the tail gate after being herded into the truck, and unless the gate can be secured quickly, the operator is in danger of having it forced open against him. With the present latch, the operation of the same is automatic since the latch element 6 is always in position ready to snap over the keeper bar when the gate is forcibly closed.

Figs. 6 to 9 inclusive show a modified form of the invention illustrated in Figs. 1 to 5. The form of the latching mechanism shown in Figs. 1 to 5 is designed for use upon tail gates or upon trailer structures wherein the tail gate when closed, is located between the side walls of the truck, whereas the form of the latching mechanism shown in Figs. 6 to 9 is designed for securing tail gates which, when closed, abut the rear edges of the truck side walls. In Figs. 6, 7 and 8, the numeral 24 designates the rear part of a side wall of a truck against which abuts the tail gate 25. In the modified form of the invention there is provided the keeper plate 26 which is secured horizontally to the rear face of the tail gate. At one end this keeper plate has the right angle extension 27 which passes across the side edge of the tail gate and terminates in the head 28 which has a substantial width extending from the angled portion 27 away from the tail gate or outwardly from the side wall of the truck. This head comprises a top flange portion 29 having an upwardly opening latch receiving recess 30, and a nose portion 31 which has an arcuate camming face 32 which is directed forwardly and inwardly toward the side wall 24 of the truck body.

As shown in Fig. 7, the angled portion 27 of the keeper bar or plate extends slightly beyond the inner face of the tail gate, thus forming a shoulder 33, and when the tail gate is in closed position where it abuts the rear vertical edge of the side wall of the truck, this shoulder 33 extends across the outer side of the truck wall and thus functions to prevent it being sprung outwardly.

The camming surface 32 of the nose portion of the keeper functions to urge the side wall 24 inwardly when the tail gate is closed in the event that such side wall has been sprung outwardly from its proper position. It will be readily seen that as the gate is closed, if the side wall is sprung outwardly, the camming surface of the nose 31 will strike the rear edge of the side wall and cause it to be forced inwardly so that it will be engaged behind the shoulder 33 when the gate is fully closed.

Each side wall of the truck has secured to the outer side thereof the latch supporting plate 34, which plate carries a pivot pin 35 upon which is oscillatably mounted the latch or hook 36. This hook is provided with the bill 37 and when the hook is down, it lies in the recess 30 and the bill 37 engages against the rear side of the head 28, as shown in Fig. 6.

At its inner end the hook 36 carries the angularly extending tail piece 38 which is here shown as extending downwardly substantially at right angles to the body of the hook. This tail piece facilitates the automatic latching of the hook through the engagement of the nose 32 with the tail piece when the tail gate is closed while the hook is in the raised position in which it is shown in Fig. 8. As is shown in this figure, the hook or latch carries a pin 39 to which is attached an end of a contractile spring 40 which is attached at 41 to the plate 34. The arrangement of the spring 40 with respect to the pivot pin 35 is such that the spring lies upon the upper side of the center of the pivot 35 when the latch is raised, so that the latch will be held in this position and when in this position, the tail portion 38 is directed rearwardly as shown. A stop pin 42 limits the upward swinging movement of the latch so that the spring will hold it in its raised or set position. When the latch is down, as shown in Fig. 6, the pull of the spring across the pivot 35 is upon the lower side of the axial center of the pivot and thus the spring tends to pull the latch into closed position. From this, it will be readily apparent that when the tail gate is open and the latch is set in its raised or inoperative position as shown in Fig. 8, it will be quickly snapped into locking position as the tail gate is closed and as the nose of the keeper plate strikes the tail piece 38 of the latch, causing it to oscillate downwardly. As the spring passes dead center, it will function to pull the latch sharply downwardly and thus bring the bill 37 into locking engagement with the head of the keeper.

From the foregoing, it will be readily seen that in both forms of the invention disclosed, no part of the latching mechanism is located inside the truck where it will be apt to injure cattle as they enter or leave the truck. It wll also be readily seen that in both forms of the invention the latching of the mechanism is entirely automatic and in both forms the drawing inwardly of the side walls of the truck body is automatically accomplished, and when the tail gate is in fully closed position, the side walls will be firmly held against lateral movement regardless of the amount of strain which may be imposed thereon.

It has been previously stated that in the structure shown in Figs. 1 to 4 inclusive, the latch 6 may be disposed in its horizontal position in engagement with the flange 16 when the gate is open and when the gate is swung to closed position, the keeper bar will snap under the head of the latch so that the latch will be automatically locked with the keeper. It is also contemplated that when the gate is open, the latch 6 may be raised to vertical position as indicated in dotted outline in Fig. 2, where it will be held on dead center by the spring 12, so that when the gate is forcibly closed, the jar incidental to the striking of the keeper bar against the end of the side wall of the trailer will cause the latch to snap down into locking position. With this arrangement, it will be seen that the latch will be maintained in a position where animals entering the trailer will not be likely to strike it and thus become injured, and at the same time, the fastening of the latch will be automatic.

What is claimed is:

1. Mechanism for securing an edge of a tail gate to a vehicle side wall, comprising a latch pivotally attached to said side wall to extend rearwardly and having a hook bill, an elongated keeper secured to the tail gate and having a portion extending beyond the outer side of the side wall transversely of the latch whereby said bill may engage across the said portion of the keeper, and a camming means forming a part of the keeper and engaging an adjacent portion of said side wall for urging the side wall inwardly with respect to the adjacent edge of the tail gate.

2. Mechanism for coupling a tail gate with a side wall of a vehicle, comprising an elongated keeper secured to the tail gate to have a portion extend beyond a side edge thereof and transversely of an edge of said wall when the gate is closed, means forming an interlocking coupling between the said portion of the keeper and an adjacent part of the side wall preventing lateral movement of the side wall from the tail gate, said means further being formed to effect inward movement of the side wall upon closing the gate, and a spring actuated latch carried by the side wall and cooperating with the keeper to form a snap coupling between the keeper and the side wall upon forcible closing of the tail gate.

3. Mechanism for securing a vehicle tail gate to a side wall of the vehicle, comprising an element secured to the side wall and extending laterally therefrom away from the adjacent gate, a keeper secured to the tail gate to extend across and position against said element when the tail gate is closed, means forming an interlocking coupling between the keeper and said element, and a hooked latch carried by the side wall for engagement across both the keeper and said element to secure the tail gate in closed position.

4. Mechanism for securing a vehicle tail gate to a side wall of the vehicle, comprising an element secured to the side wall and extending laterally therefrom away from the adjacent gate, a keeper secured to the tail gate to extend across and position against said element when the tail gate is closed, means forming an interlocking coupling between the keeper and said element, a hooked latch carried by the side wall for engagement across both the keeper and said element to secure the tail gate in closed position, and means forming a part of the keeper and engaging said element to effect the alinement of parts of said interlocking coupling whereby the interlocking of the same may be accomplished.

5. Mechanism for securing a vehicle tail gate to a side wall of the vehicle, comprising an element secured to the side wall and extending laterally therefrom away from the adjacent gate, a keeper secured to the tail gate to extend across and position against said element when the tail gate is closed, means forming an interlocking coupling between the keeper and said element, a hooked latch carried by the side wall for engagement across both the keeper and said element to secure the tail gate in closed position, and a camming tongue forming an integral part of the keeper and adapted to engage against an end of said element when the tail gate is moving to closed position to facilitate the interlocking of said coupling means.

6. Mechanism for securing a vehicle tail gate to a side wall, comprising a flange secured to said side wall to extend laterally therefrom, a hook latch pivotally attached to the side wall and having an operative position in which it extends across an end of said flange, a keeper bar secured to the tail gate and having an end extended across said flange when the gate is in closed position, a pin carried by the keeper bar for engagement in an aperture in the flange when the tail gate is closed, said hook latch being resiliently coupled with the keeper bar when the gate is closed, and a tongue forming an integral part of the keeper bar for sliding engagement across an edge of the flange to aline said pin and opening.

7. Mechanism for securing a vehicle tail gate to a side wall, comprising a flange secured to said side wall to extend laterally therefrom, a hook latch pivotally attached to the side wall and having an operative position in which it extends across an end of said flange, a keeper bar secured to the tail gate and having an end extended across said flange when the gate is in closed position, a pin carried by the keeper bar for engagement in an aperture in the flange when the tail gate is closed, said hook latch being resiliently coupled with the keeper bar when the gate is closed, a tongue forming an integral part of the keeper bar for sliding engagement across an edge of the flange to aline said pin and opening, said latch having a rounded head edge forming a cam, and spring means normally drawing said latch into a horizontal position to extend rearwardly from said wall, said latch when in normal spring retained position having the cam portion of the head thereof engaged by the keeper bar upon forcible closing of the tail gate to facilitate the automatic raising of the latch for the coupling of the same with the keeper bar.

8. Mechanism for securing together a tail gate and a body wall wherein said tail gate when closed is in abutting relation with a vertical edge of the body wall, comprising a keeper carried by the tail gate and having a portion extended beyond the face of the tail gate which abuts the said edge of the wall to form a shoulder against which the wall bears, means forming a part of said keeper providing a camming element arranged to engage the said edge of the wall as the gate is moved to closed position to urge the wall into position against the shoulder, and means for forming a latching connection between the wall and the keeper.

9. Mechanism for securing a tail gate to a vehicle wall in which the gate abuts an edge of the wall, comprising a keeper adapted to be secured to the gate and having a portion extending across an edge of the gate and beyond that face of the gate which abuts the said edge of the wall to form a shoulder against which the outer side of the wall bears when the gate is closed, said portion of the keeper having a head extending laterally with respect to the wall, a nose forming a forward continuation of the head, said nose having a forwardly and inwardly facing camming surface for contact with the said edge of the wall in the closing of the gate to facilitate springing the wall inwardly into position against the shoulder, and means for establishing a latching connection between the head and said wall.

10. Mechanism for securing a tail gate to a vehicle wall in which the gate abuts an edge of the wall, comprising a keeper adapted to be secured to the gate and having a portion extending across an edge of the gate and beyond that face of the gate which abuts the said edge of the wall to form a shoulder against which the outer side of the wall bears when the gate is closed, said portion of the keeper having a head extending laterally with respect to the wall, a nose forming a forward continuation of the head, said nose having a forwardly and inwardly facing camming surface for contact with the said edge of the wall in the closing of the gate to facilitate springing the wall inwardly into position against the shoulder, a hooked latch pivotally attached to the wall, and means forming a part of the head facilitating the connection of the hooked latch with the head.

11. Mechanism for securing a tail gate to a vehicle wall in which the gate abuts an edge of the wall, comprising a keeper adapted to be secured to the gate and having a portion extending across an edge of the gate and beyond that face of the gate which abuts the said edge of the wall to fom a shoulder against which the outer side of the wall bears when the gate is closed, said portion of the keeper having a head extending laterally with respect to the wall, a nose forming a forward continuation of the head, said nose having a forwardly and inwardly facing camming surface for contact with the said edge of the wall in the closing of the gate to facilitate springing the wall inwardly into position against the shoulder, a hook member pivotally attached to the wall and having a bill adapted to engage across said head when the tail gate is in closed position, a tail piece forming a part of said hook, and spring means coupling the hook with the adjacent wall, said spring means being adapted to hold the hook in raised position in which said tail piece is extended rearwardly for engagement by said nose to effect the movement of the hook downwardly upon the closing of the tail gate and to pull said hook into engaging relation with the head following its partial actuation through engagement of the nose with the tail piece.

SPENCER R. STRADER.